United States Patent
Jassal et al.

(10) Patent No.: US 11,612,849 B2
(45) Date of Patent: Mar. 28, 2023

(54) SLOT VENTURI WITH APERTURE CONTROL

(71) Applicants: Devpreet Jassal, Selkirk (CA); Man Zhou, Toronto (CA); Liang Xiong, Toronto (CA)

(72) Inventors: Devpreet Jassal, Selkirk (CA); Man Zhou, Toronto (CA); Liang Xiong, Toronto (CA)

(*) Notice: Subject to any disclaimer, the term of this patent is extended or adjusted under 35 U.S.C. 154(b) by 166 days.

(21) Appl. No.: 17/165,650

(22) Filed: Feb. 2, 2021

(65) Prior Publication Data

US 2021/0252447 A1    Aug. 19, 2021

Related U.S. Application Data

(60) Provisional application No. 62/977,661, filed on Feb. 17, 2020.

(51) Int. Cl.
| | |
|---|---|
| *B01F 23/23* | (2022.01) |
| *B01D 47/00* | (2006.01) |
| *B01D 47/10* | (2006.01) |
| *B01D 47/06* | (2006.01) |
| *B01F 23/213* | (2022.01) |

(52) U.S. Cl.
CPC ............. *B01D 47/10* (2013.01); *B01D 47/06* (2013.01); *B01F 23/213* (2022.01)

(58) Field of Classification Search
CPC .... B01F 23/213; B01F 23/2132; B01D 47/10; B01D 47/06
See application file for complete search history.

(56) References Cited

U.S. PATENT DOCUMENTS

| | | | |
|---|---|---|---|
| 3,638,925 A | * | 2/1972 | Braemer ................ B01D 47/10 |
| | | | 261/109 |
| 4,023,942 A | | 5/1977 | Brady et al. |
| 4,043,772 A | | 8/1977 | Lundy |
| 4,167,401 A | | 9/1979 | Melnyk |
| 4,206,159 A | | 6/1980 | Angelini et al. |
| 5,178,653 A | | 1/1993 | Lilja et al. |
| 5,826,800 A | | 10/1998 | Reither |
| 6,102,990 A | | 8/2000 | Keinanen et al. |

FOREIGN PATENT DOCUMENTS

CN        109459331 A  *  3/2019

* cited by examiner

*Primary Examiner* — Robert A Hopkins
(74) *Attorney, Agent, or Firm* — McAndrews, Held & Malloy, Ltd.

(57) ABSTRACT

Systems and methods for controlling air pollution using a venturi scrubber with a venturi throat having multiple variable apertures. In some embodiments, the venturi throat comprises a first plate and a second plate, each with multiple apertures. The plates may move relative to each other. The dimensions of the apertures may be determined based on the movement of two plates.

13 Claims, 7 Drawing Sheets

SLOT VENTURI WITH APERTURE CONTROL

CROSS-REFERENCE TO RELATED APPLICATIONS

This application claims the benefit of U.S. Provisional Application No. 62/977,661 filed Feb. 17, 2020. The entirety of the above referenced application is hereby incorporated by reference.

TECHNICAL FIELD

Aspects of the present disclosure relate to scrubbers used to control air pollution. More specifically, certain embodiments of the disclosure relate to a system and method for removing contaminants from air using a venturi throat with multiple controllable apertures.

BACKGROUND

Conventional approaches for air pollution control may be costly, cumbersome, and/or inefficient—e.g., they may be complex and/or time consuming to implement. The disclosed venturi throat provides one or more advantages over currently available systems with regards to operability and manufacturing of pollution control systems. The advantages may include, but are not limited to, reductions in cost of manufacturing, and/or increased ease of manufacturing.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using a venturi scrubber with multiple variable apertures for cleaning a contaminated gas flow, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 6A shows the initial position of two plates, in which the apertures are fully open. FIG. 6B shows an intermediary position of the plates, with apertures partially open. FIG. 6C shows the apertures in the closed position.

DETAILED DESCRIPTION

Figure 1:
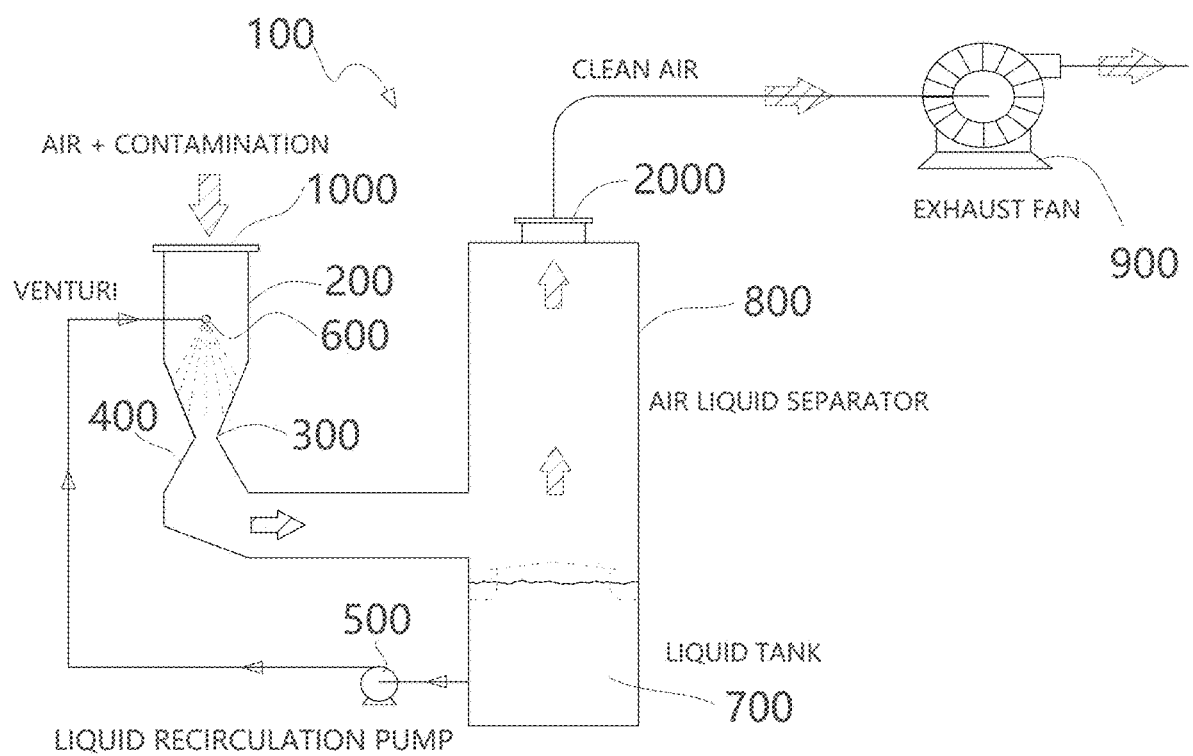
FIG. 1 shows an example scrubber system including a venturi throat, in accordance with an example embodiment of the disclosure.

Air pollution is a prevalent problem in society and methods to mitigate it are of high concern. One method of addressing air pollution is by the use of scrubbers to clean a gas effluent. Scrubbers may be of a variety of types, including, but not limited to, packed scrubbers, nozzle scrubbers and venturi scrubbers. Venturi scrubbers are wet scrubbers, which use a liquid that is atomized by an inflowing gas stream. Venturi scrubbers have an inlet portion that converges the gas stream into a narrow throat, and then a portion that allows the stream to diverge again. During passage through the scrubber, polluting agents such as particulate matter are transferred from the inlet gas stream into the liquid.

One goal of all scrubbers is to remove contaminants, e.g., move the contaminants from a gas phase into a liquid phase that can subsequently be treated. In a traditional scrubber, there is a limit on the gas to liquid ratio (L/G ratio) that can be run through the scrubber. The typical limit of the liquid to gas ratio in a traditional scrubber may be about 1 to 3 liters of liquid per one cubic meter of gas. In the case of scrubbers such as packed towers, increasing the L/G ratio above an upper limit of about 3 liters of liquid per one cubic meter of gas can cause flooding in the tower, which reduces the efficiency of the scrubber.

The venturi scrubber is a walled tube that converges in the direction of flow and forces a contaminated inlet gas stream to pass through a narrow constriction, which is also known as a venturi throat. During operation, water or liquid is sprayed on, above and/or near the narrow throat. The liquid and air mix together and the contaminants from the air are transferred into the liquid phase. The liquid is atomized and the contaminants in the air phase penetrate the atomized scrubbing liquid.

As discussed in Environmental Protection Agency guidelines (EPA/452/B-02-001), droplet size may be optimized for collection of particulate matter. The surface area to volume ratio of smaller droplets is larger and thus they can capture more particles per volume of liquid. However, there is a lower limit on droplet size. If the droplet size becomes too small, the momentum of the waste gas can be transferred to the droplets, decreasing the relative velocity between the droplet and particles. When the relative velocity is lower, the collection efficiency decreases.

Wet scrubbers may control the size of droplets in a variety of manners. Droplet size may be determined by the type of nozzle and the system operating conditions. In dynamic scrubbers, the droplet size is controlled by the speed of the rotor and the L/G ratio. In venturi scrubbers, the droplet size is controlled by the L/G ratio and the gas velocity in the throat. See EPA/452/B-02-001, 2.4.1.6 Droplet Size.

Once the contaminants are in the liquid phase, the contaminated liquid may be separated from the clean air.

As a polluted inlet gas stream travels through the converging section of a venturi scrubber, gas velocity increases as the area of the tube decreases into the throat. A scrubbing liquid (e.g., water) is sprayed on, above and/or near the throat and the scrubbing liquid and polluted inlet gas stream turbulently mix. As a result of the mixing, the pollutants are transferred into the scrubbing liquid. The velocity decreases as the stream flows into the divergent portion of the tube.

Traditional venturi scrubbers may have different types of throats, although many venturi scrubbers have only one fixed opening. Some have a variable opening; the venturi throat can be made variable with the use of a constriction that moves to narrow (and then open) the throat. One venturi scrubber with variable throat is described in U.S. Pat. No. 5,826,800 to Karl Reither which has venturi grooves with adjustable cross-sections between the walls of the venturi tube. Venturi throats with variability in their throughput are also referred to as variable aperture throats.

For maximum efficiency in a venturi scrubber, the scrubbing liquid droplet size should be optimized. The efficiency of the scrubber increases if the number of optimum size droplets to collect the contamination in the air is increased. This may be done by increasing the L/G ratio, and the L/G ratio may be increased by the use of multiple throats. A single or double throat has a limitation on the L/G ratio of 3. If the L/G ratio is increased above 3 in a single slot venturi, the force required to push through the venturi throat increases, which means high power consumption or operation cost. If the L/G ratio is increased beyond this limit, the venturi throat becomes very constricted due to the presence of excess liquid, which makes the liquid droplets smaller than the optimum and efficiency drops. Multiple throats provide more surface area for interaction between liquid and gas, which may generate optimum sized liquid droplets in higher numbers to capture contaminants in the air. The multiple throat venturi will provide more surface area for the interaction of liquid and gas and this means more optimum sized scrubbing liquid droplets and hence better efficiency.

As described and illustrated herein, use of a new type of venturi scrubber having a throat with multiple variable apertures can provide improved efficiency by allowing the scrubber to be run at a higher L/G ratio. The new venturi scrubber described herein can create large amounts of optimum size droplets to arrest contaminants. Apertures may be slots, or other shapes.

This scrubber can also clean gas streams utilizing a large stream of liquid. The multiple openings can increase the contact surface between the scrubber liquid and impurities in the exhaust gases and allows for the treatment of air/gases with large amounts of both gaseous and particulate impurities.

Gaseous impurities that can be removed by the venturi scrubber having a throat with multiple variable apertures disclosed herein include but are not limited to hydrogen sulfide, sulfur dioxide, etc. In order to achieve a run rate having a higher L/G ratio, the disclosed venturi has multiple apertures the dimension of which may be controlled.

As described above, a venturi scrubber allows air to pass through a narrow throat with a concomitant water or liquid spray. The liquid and air mix in the throat and the contaminants from the air enter the liquid phase. The present application describes overcoming the problem of a limit on the liquid to gas ratio in a traditional scrubber by the use of multiple variable apertures. The multiple apertures are designed to increase the contact between the scrubbing liquid spray and the exhaust gases laden with pollutants, which may include, but are not limited to, dust particles, liquid aerosol particles, and impure gases. The variable aperture control can be specifically delineated for removal of the specific type(s) of pollution contaminants (e.g. dust particles, liquid aerosol particles, impure gases, etc.) present in an exhaust gas stream. Once the contaminants are in the liquid phase, the contaminated liquid is separated from the cleaned air.

The scrubbing liquid may be water alone, or may be water with additional chemicals (e.g., cleaning chemicals). The cleaning chemicals may be varied based on the type of pollution in the gas stream. The concentration of the cleaning chemicals may also be varied. In some embodiments, the scrubbing liquid may be a cleaning chemical alone. The scrubbing liquid is sprayed with a sprayer. The sprayer may be located on, above and/or near the venturi throat and the sprayer may use a variable spray pattern to spray the scrubbing liquid.

The venturi scrubber having a throat with multiple variable apertures disclosed herein has the ability to vary the dimensions of the apertures based on the movement of two plates, which is described in detail below. The number of apertures and the width of each aperture may be chosen to the appropriate size for the application. In some embodiments, the aperture size may be between 12 mm (0.5") and 50 mm (2"). The width of the aperture is process driven and could have sizes larger than 50 mm (2") or smaller than 12 mm (0.5"). The number of apertures would depend on the diameter of the venturi, and the diameter of the venturi depends on the gas flow. A larger diameter will have more apertures, e.g., each 50 mm (2") aperture can be 50 mm (2") apart to fill the diameter of the venturi. The aperture may be chosen to the appropriate size for the application. A typical 50 mm (2") gate valve mechanism may be used to vary the position of the multiple apertures (through movement of the plates). The apertures may be open or almost closed or any intermediary position as determined by the desired application.

The mechanism of the throat with multiple variable apertures disclosed herein is achieved with two plates (e.g., a first plate and a second plate), each having multiple apertures. The plates may move relative to each other. The dimensions of the apertures may be determined based on the movement of two plates. In one embodiment, sliding of the plates, one over the other, allows for the variability in the multiple openings, from almost completely closed, to completely open and various points in-between.

For automated control, a positioner used for a knife gate valve or other actuators, or a gear box motor can easily control the sliding of the plates that can produce the opening and closing of the apertures with a small movement (equal to no more than the size of the apertures, e.g., 50 mm (2"). The movement required in traditional variable throat venturi scrubbers is more than 150 mm (2"), and the equipment used is heavy, costly and cumbersome.

The gearbox, motor arrangement and/or positioner to open and close the apertures can provide precise control, and can use lighter and less costly equipment to affect the sliding of the two plates. For an aperture typically between 12 mm (0.5") to 50 mm (2") in dimension, a 10.8 mm (0.43") to 45 mm (1.8") movement respectively of the aperture control system can achieve about 90% reduction in the aperture size, which can provide ease in operation for variable flow conditions.

The plates may be round, square, rectangular or other shapes as determined by the shape of the venturi throat. As discussed further below, apertures in the plates may be of various sizes and shapes and may be laid out in patterns. In some embodiments, the plates fit in an opening in the throat that is accessible from outside the scrubber. The plates may include vanes, which may be used to direct the flow of contaminated air/gas towards the apertures in the plate (e.g., slots). The vanes may be located at the edge of one or more of the apertures. The vanes may be variable in shape; in some embodiments the vanes may be saw-tooth or triangular in shape.

A spray nozzle is positioned relative to the throat to spray the scrubbing liquid on, above and/or near the narrow throat. In some embodiments, the location of the spray nozzle and scrubbing liquid spray may be above the venturi apertures. The height of the spray nozzle may be adjusted so that the spray pattern of the scrubbing liquid covers the whole aperture area.

During the scrubbing process, energy is consumed as the velocity of the exhaust gas and scrubbing liquid particles is increased, creating turbulent flow. Due to turbulence in the flow, the scrubbing liquid particles are sheared into droplets which increases the contact surface area between the liquid and the contaminants in the gases. The multiple apertures create this turbulence at multiple locations, thus increasing the contact surface area for the interaction of contaminants with the scrubbing liquid. This leads to higher efficiencies at lower energy cost.

In an example scenario, landfill gas may be treated to remove pollutants, which then allows the cleaned landfill gas to be put to productive use. Landfill gas comprises methane, carbon dioxide and hydrogen sulfide ($H_2S$). Removal of $H_2S$ before further use of landfill gas is important, as there are governmental limits on sulfur emissions. Low amounts of sulfur emissions are permissible but higher amounts of sulfur ($H_2S$) emissions cause acid rain. The $H_2S$ can also cause damage due to its corrosive nature. In order to utilize the landfill gas, the gas needs to be purified by removing $CO_2$ and the removal of $CO_2$ is done with membranes. The presence of $H_2S$ is detrimental to the $CO_2$ removal membranes; hence, removal of $H_2S$ pollutants before further using landfill gas is important.

The $H_2S$ may be removed with the use of caustic (NaOH) or lime ($Ca(OH)_2$) solution as scrubbing liquid. $H_2S$ is acidic, while caustic and lime are basic. In some aspects, in order to remove $H_2S$, caustic may be used such that the resultant pH in the liquid is 9. The pH of 9 means the concentration of caustic in the liquid is at 0.004%. Above this concentration, caustic not only reacts with $H_2S$, it also reacts with $CO_2$ to such an extent that the gas cleaning is not economically feasible. Increasing caustic concentration results in further reaction of carbon dioxide and further waste. In such a process, the cost of loss of chemicals to $CO_2$ can be in the millions, which is why landfill gas is usually not cleaned and put into consumption.

One way to mitigate this problem is to use a large quantity of dilute caustic solution to react with the gas stream, i.e., a high L/G ratio. In an aspect of the present invention, the venturi scrubber with multiple variable apertures provides the necessary increased contact surface area to affect this solution. As discussed above, the increase in surface area is due to the multiple variable apertures. In the above scenario, the pollutant gas stream can be divided into multiple small streams (through the use of the multiple apertures) and then treated with a dilute caustic solution, resulting in less overall loss of caustic, which could result in an economically feasible treatment of landfill gases.

Referring to FIG. 1, there is shown a venturi scrubber 100 comprising a converging section 200, a diverging section 400 and a throat 300 therebetween. In one embodiment, the venturi scrubber 100 has a sprayer 600 fed by a liquid recirculation pump 500. The location of the sprayer can be adjusted to vary the distance between the sprayer and the throat. Air and contamination enter at the top of the venturi tube 1000 and exit as clean air after the scrubbing process at the exit 2000. Although the venturi tube is shown in a vertical position, it should be appreciated that the venturi tube could also be arranged horizontally or at any other angle. An exhaust fan 900 assists in the clear air exit process. The fan also provides power to push/pull the air through the venturi throat. Power consumption of the fan can be a major component of the operation cost. Contaminated water is separated from the clean air in the air-liquid separator 800. The contaminated liquid is collected in a liquid tank 700.

Figure 2:
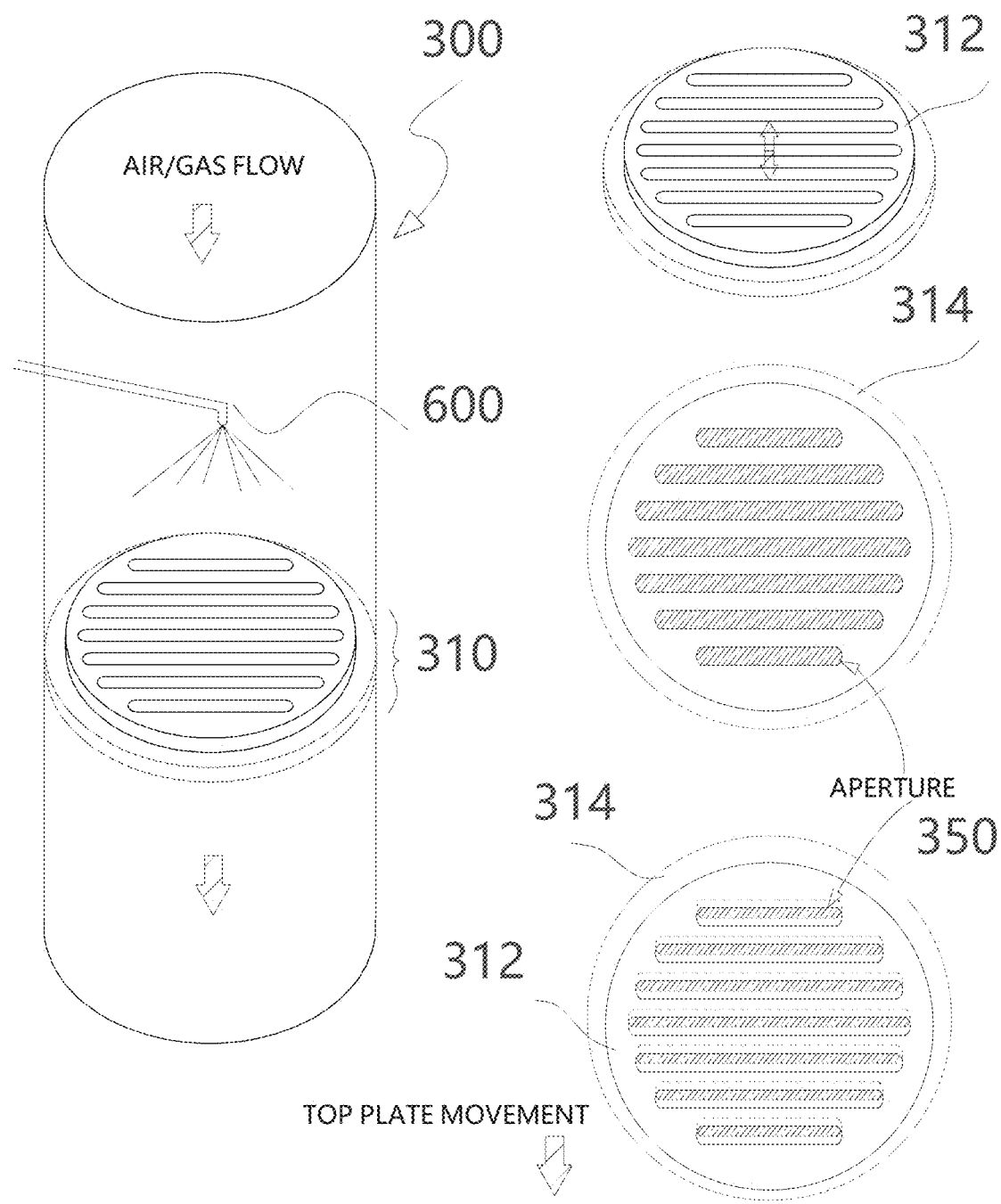
FIG. 2 shows a venturi throat with multiple variable apertures, in accordance with an example embodiment of the disclosure.

Referring to FIG. 2, in one embodiment, the venturi throat 300 comprises two plates 310 in line with the air/gas flow within the tube. These plates have apertures 350 therein. The first plate 312 has a front face and a back face and multiple apertures therein extending between the front face and the back face. The second plate 314 also has a front face and a back face and multiple apertures therein extending between the front face and the back face. Sliding of the two plates, one over the other, as shown by the arrows in FIG. 2, changes the size of the apertures 350 and thus may increase or decrease the flow and pressure loss across the throat. Increased pressure loss indicates more interaction between the liquid and gas. In this figure, the dotted lines represent the movement of the plates, one over the other.

In some embodiments, the two plates may be round, square, rectangular or other shapes as determined by the shape of the venturi throat. For example, the first 312 and second 314 plates may be round (FIG. 2) or rectangular (FIGS. 4 and 5). The plates are connected to a mechanism that allows for their movement such as a gearbox and/or positioner. In some embodiments, the mechanism may be a gate valve-type mechanism, which has motorized or manual control.

The plates may move in various manners with respect to one another. In some embodiments, the movement of the plates is sliding relative to each other. For example, one plate may be fixed or stationary, while the other plate is movable and slides relative to the stationary plate. The sliding may be along a linear axis, or another axis, such as circular/curved. In some embodiments, the plates may be accessible from outside the scrubber. In further embodiments, the gearbox and/or the positioner will move one of the plates (e.g., a top plate) while the second plate (e.g., a bottom plate) will remain fixed.

Each plate has multiple apertures 350 therein that can be lined up with (match) each other. As the plates are moved relative to each other (e.g., by sliding or other movement) the apertures between the two plates 312, 314 can partially or completely line up, thus opening or closing the overall size of the aperture relative to the gas flow. In some embodiments, the apertures 350 are slots. Other aperture shapes include, but are not limited to, openings that are round (circular), oval, diamond shaped, square or other shapes. In some embodiments, the aperture shape is circular, diamond or oval. Combinations of different aperture shapes within each plate are also contemplated. Apertures may line up with each other in a regular linear pattern across the plate, or have an irregular or other pattern.

Figures 3A, 3B:
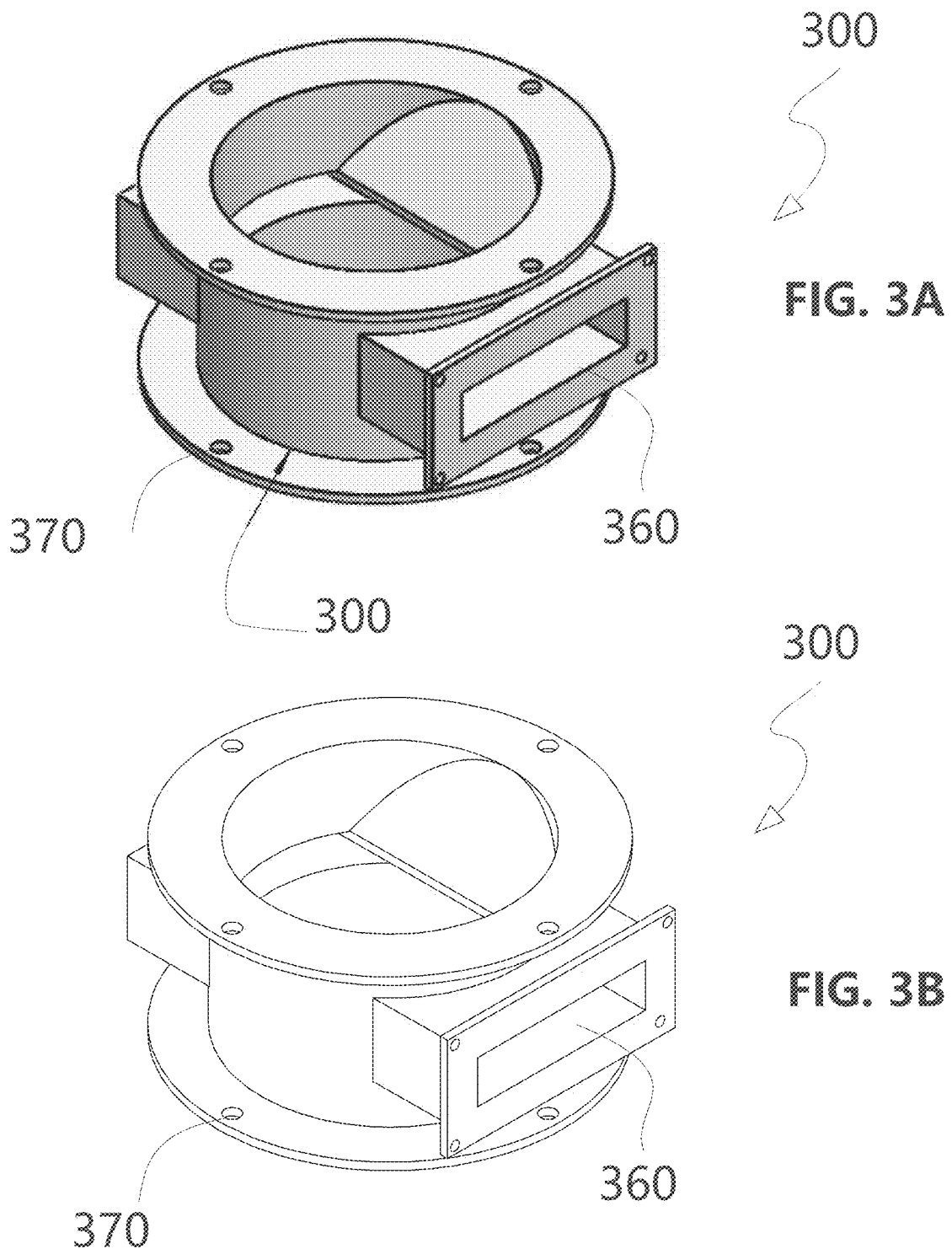
FIGS. 3A and 3B shows a venturi throat module, in solid view (3A) and line drawing view (3B), in accordance with an example embodiment of the disclosure.

Referring to FIG. 3, in one embodiment the venturi throat 300 comprises a modular unit that can be inserted into an existing system. This modular unit has an opening 360 where the plates with apertures (312 and 314 not shown) can be inserted. Connection points 370 can be used to connect the modular venturi throat into the tube of an existing scrubber system. The size of the modular unit varies depending on the size of the overall venturi tube. The size of the modular unit could be adjusted from 150 mm (0.5') to 3500 mm (11') or more. The modular until comprises a section of the venturi tube. FIG. 3A shows a solid view and FIG. 3B shows line drawing view of an exemplary modular unit.

Figure 4A:
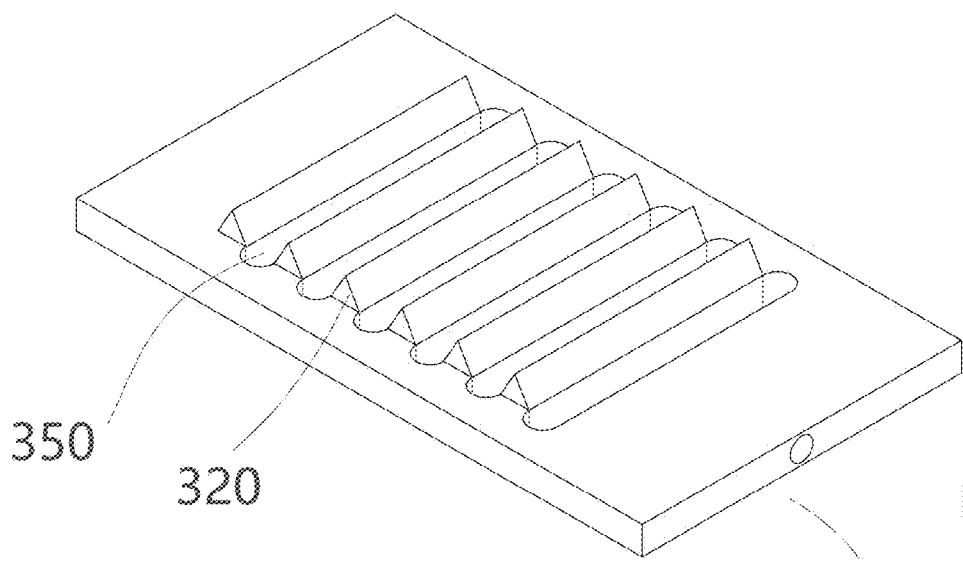
FIGS. 4A and 4B show a solid view (4A) and line drawing view (4B) of a first plate with apertures therein, in accordance with an example embodiment of the disclosure.
Figure 4B:
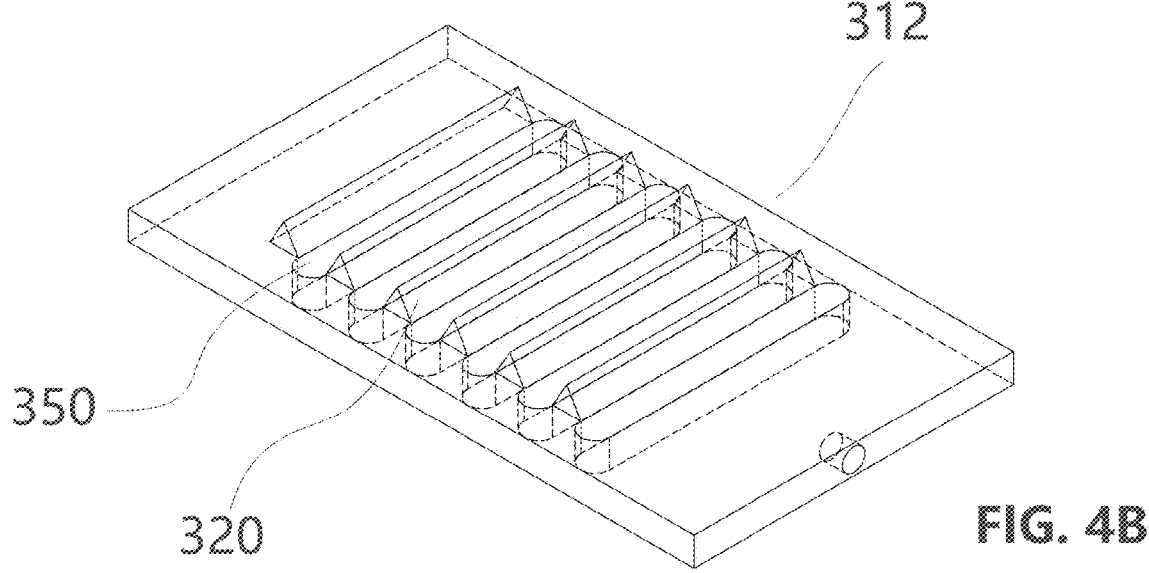

FIGS. 4 and 5 show embodiments of the two plates 312, 314. FIG. 4 illustrates a first plate 312 with multiple apertures 350, which are slots positioned in a regular linear pattern across the face of the plate. The first plate 312 is rectangular and has a front face and a back face, and multiple apertures 350 therein extending between the front face and the back face. In this embodiment, vanes 320 are included on the first plate 312 and the vanes 320 are at the long edge of each of the slot apertures 350. The vanes 320 are used to direct the flow of gas/air towards the apertures 350 (e.g., slots). Additionally, in some embodiments, the apertures 350 (e.g., slots) may be at an angle to the direction of flow. The vanes 320 may be triangular in shape. In some embodiments, the vanes are equilateral triangles having sides of about 0.2 to about 0.6 inches. FIG. 4A shows a solid view and FIG. 4B shows line drawing view of an exemplary first plate.

Figure 5A:
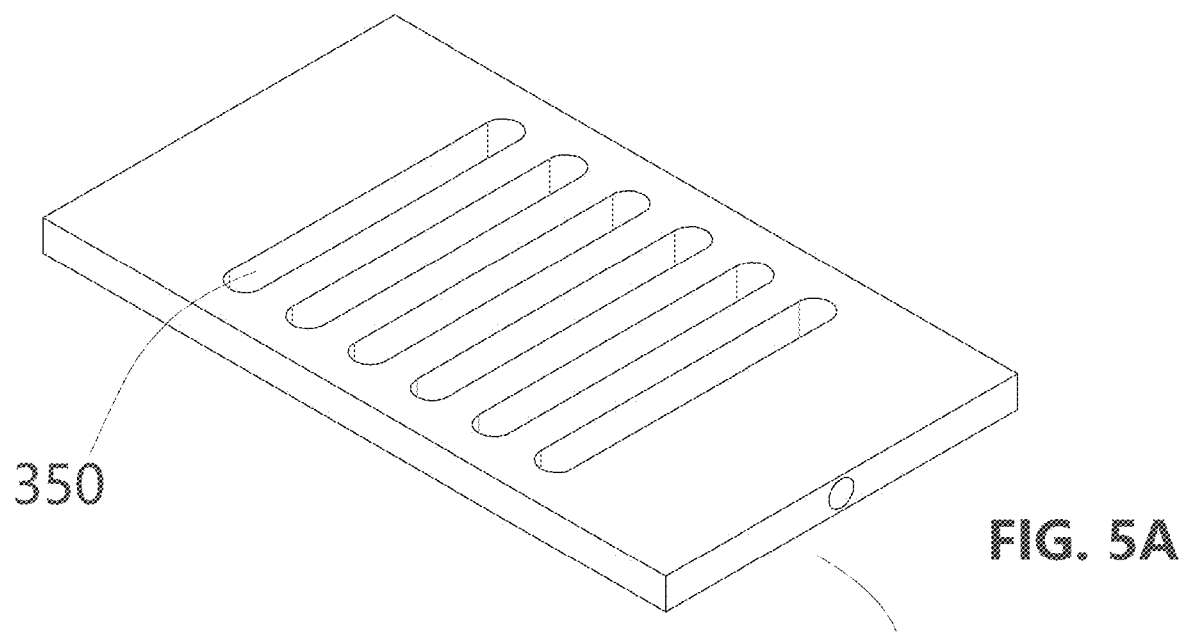
FIGS. 5A and 5B show a solid view (5A) and line drawing view (5B) of a second plate with apertures therein, in accordance with an example embodiment of the disclosure.
Figure 5B:
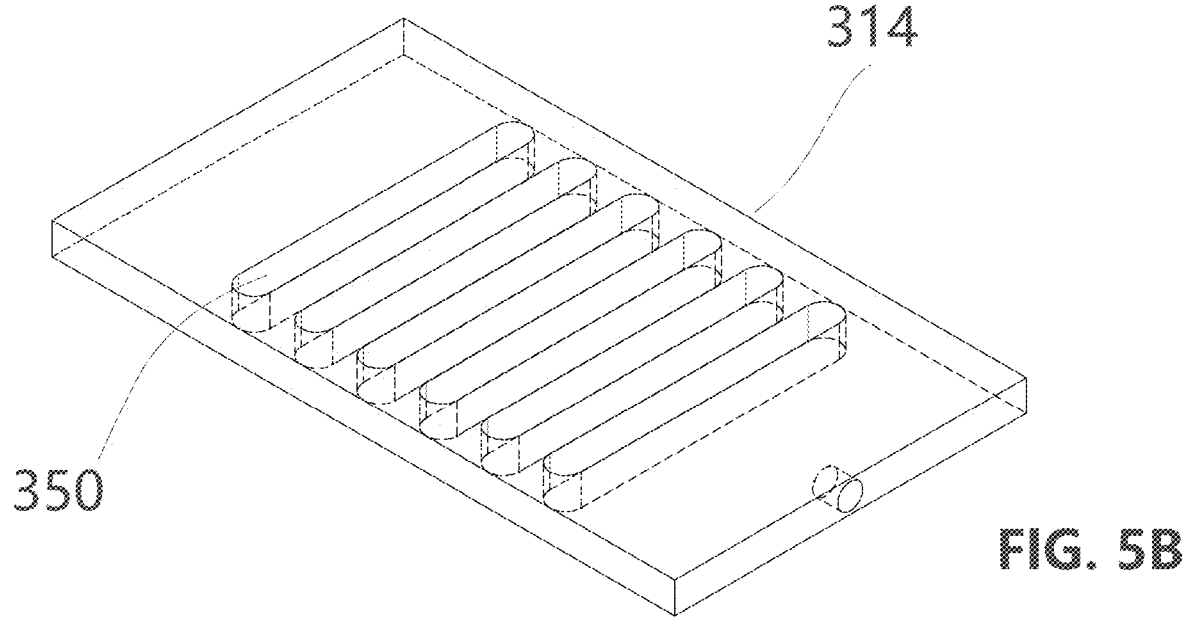

FIG. 5 illustrates a second plate 314 with multiple apertures 350, which are slots positioned in a regular linear pattern across the face of the plate. In this embodiment, the second plate 314 is rectangular with identical dimensions to the first plate. The second plate 314 has a front face and a back face, and multiple apertures 350 therein extending between the front face and the back face. The plates in FIGS. 4 and 5 have apertures that line up with each other and can be used together in a venturi throat where the front face of the second plate is positioned adjacent the back face of the first plate such that said multiple apertures in said first plate line up with said multiple apertures in said second plate. The plates can be slid relative to each other to change the size of the multiple apertures. FIG. 5A shows a solid view and FIG. 5B shows line drawing view of an exemplary second plate.

Figure 6A:
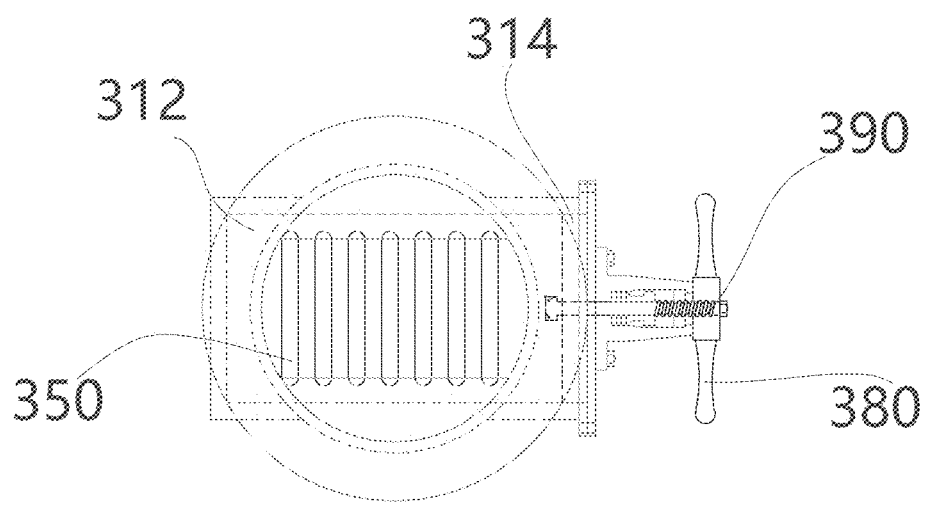
FIGS. 6A-6C show plates in a venturi throat module wherein the movement of the plates is controlled with a manual-control, gate valve-type mechanism, in accordance with an example embodiment of the disclosure.
Figure 6B:
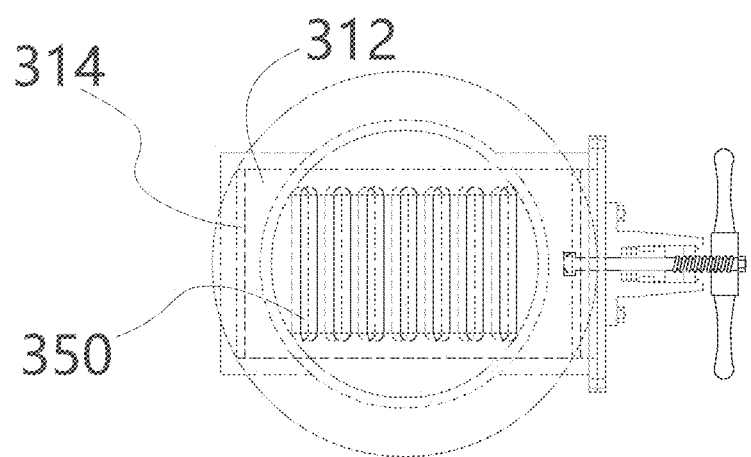
Figure 6C:
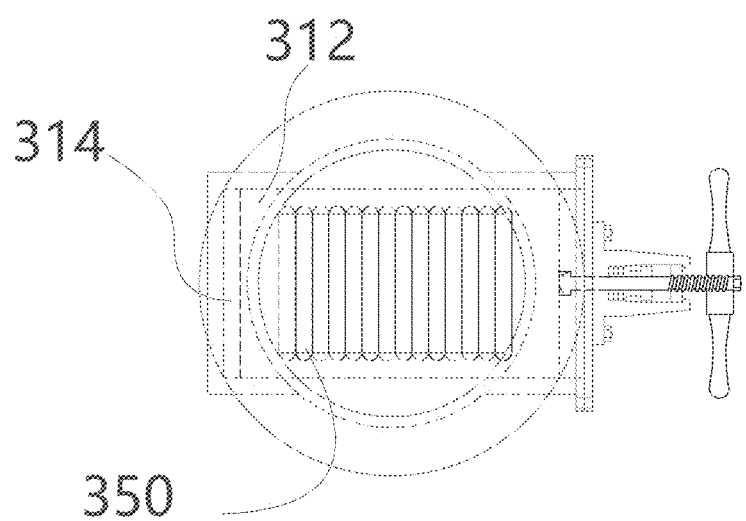

FIG. 6 illustrates plates in an embodiment of a venturi throat module that are controlled with a manual-control, gate valve-type mechanism. The mechanism has a hand wheel 380 and a stem 390. By turning the hand wheel clockwise or counterclockwise, the top plate starts sliding to open/close the apertures. In this embodiment, the bottom plate is fixed while the top plate position is adjustable. A first plate 312 with multiple apertures 350, which are slots positioned in a regular linear pattern across the face of the plate is shown. A second plate 314 with multiple apertures 350, which are slots positioned in a regular linear pattern across the face of the plate, is also shown. The apertures in the two plates align with each other when in a fully open or closed position. The plates can be slid relative to each other to change the size of the multiple apertures. FIG. 6A shows the initial position of the two plates, in which the apertures are fully open. FIG. 6B shows an intermediary position of the plates, with apertures partially open. FIG. 6C shows the apertures at the almost fully closed position. In this figure, the dotted lines represent the movement of the plates, one over the other.

To simplify the illustration, the operation in FIG. 6 is based on manual control, although the gate valve-type mechanism may also be under automatic control. The key mechanism of aperture control is the same for automated control and manual control; however, automated control provides an easier and more precise operation.

The first plate and second plate may be the same or similar in size. The size of the plates is made to correlate with diameter of the venturi scrubber. In some embodiments, the plates are rectangular and the ratio of the longer dimension to the shorter dimension may range from about 1.1:1 to about 2.5:1, or more. Plates may be from about 0.1 to about 0.8 inches or more in thickness.

The diameter of the venturi tube may be up to about 3.5 meters (approx. 11.5 feet) or more. As discussed above, the apertures may be chosen to the appropriate size for the application. In some embodiments, the aperture size may be between about 12 mm (0.5") to about 50 mm (2"). The width of the aperture is process-driven and could have sizes larger than about 50 mm (2") or smaller than about 12 mm (0.5") depending on application. In some embodiments, the disclosed venturi throats can be used to retrofit existing scrubbers.

Figure 7:
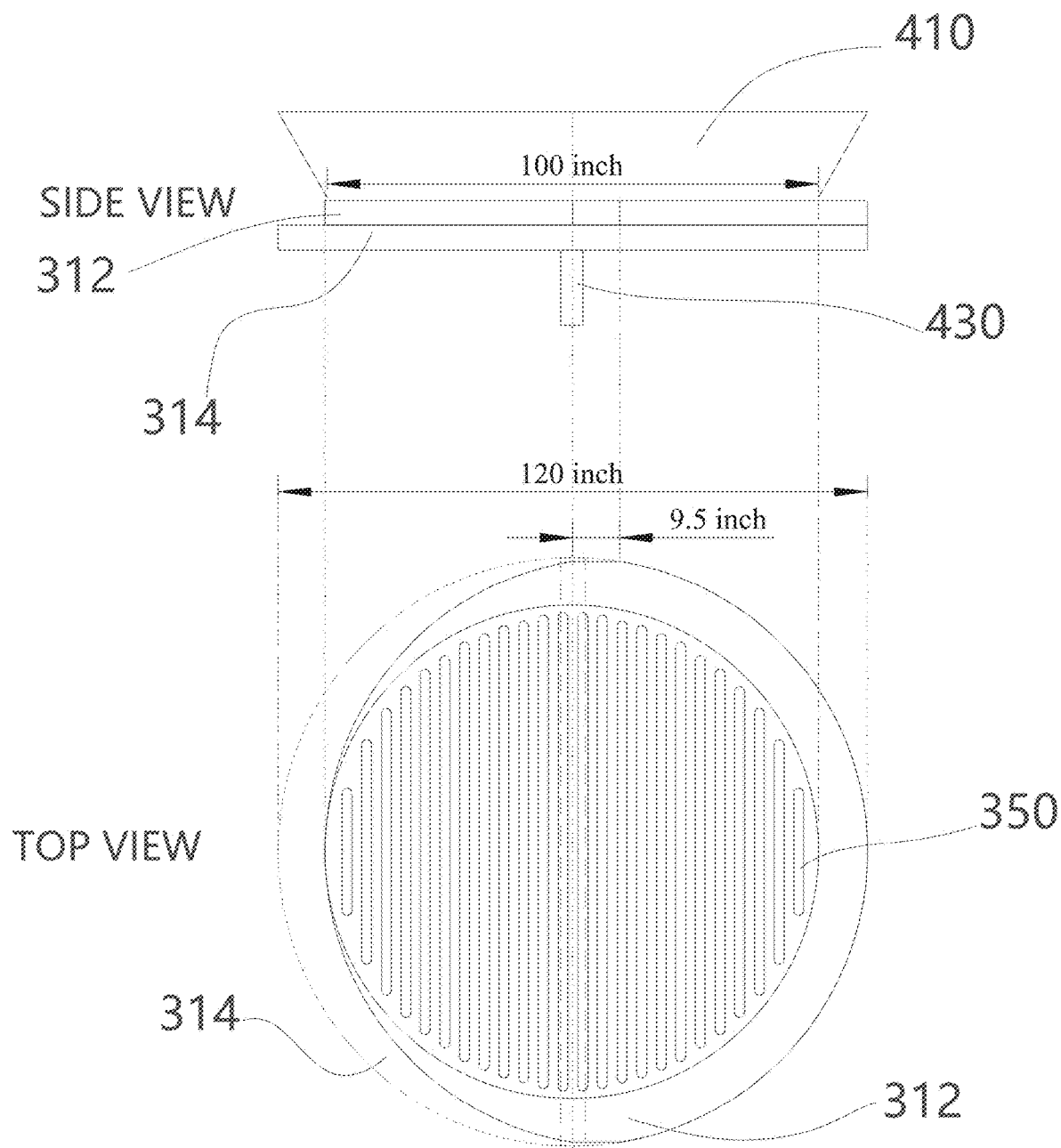
FIG. 7 illustrates a commercial size system where the venturi tube may be 10 feet in diameter, in accordance with an example embodiment of the disclosure.

FIG. 7 illustrates an embodiment of a commercial size system where the venturi section may be about 10 feet in diameter. A slot pattern for the apertures is shown where the apertures are slots that are about 2 inches wide, for a total of 26 slots in the 10-foot diameter tube. The commercial size system has a top cone 410 and a support 430 for the plates. A first plate 312 with multiple apertures 350, which are slots positioned in a regular linear pattern across the face of the plate, is shown. A second plate 314 with multiple apertures 350, which are slots positioned in a regular linear pattern across the face of the plate, is also shown.

In the FIG. 7 embodiment, one or both of the plates may include a straight or flattened portion as part of their diameter to accommodate movement of the circular plates within the cylindrical throat. Depending on the size of the throat, the straight edge may be 2 inches or more. In the embodiment shown in FIG. 7, the straight edge is 9.5 inches.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "Example" means serving as a non-limiting example, instance, or illustration. As utilized herein, the terms "e.g.," and "for example" set off lists of one or more non-limiting examples, instances, or illustrations. As utilized herein, a device is "operable" to perform a function whenever the device comprises the necessary hardware and/or software/code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:
1. A venturi scrubber comprising a venturi tube, which converges in the direction of flow to a throat:
  said throat comprising a first plate and a second plate;
  said first plate having a front face and a back face and multiple apertures therein extending between the front face and the back face;

said second plate having a front face and a back face and multiple apertures therein extending between the front face and the back face;

wherein the front face of the second plate is positioned adjacent the back face of the first plate such that said multiple apertures in said first plate line up with said multiple apertures in said second plate; and wherein said first plate and said second plate slide relative to each other to change the size of the multiple apertures.

2. The venturi scrubber of claim 1, wherein said multiple apertures are slots.

3. The venturi scrubber of claim 2, wherein said slots are at an angle to the direction of flow.

4. The venturi scrubber of claim 2, wherein vanes are used to direct the flow towards said slots.

5. The venturi scrubber of claim 1, wherein said multiple apertures are circular, diamond shaped or oval.

6. The venturi scrubber of claim 1, further comprising a sprayer to spray scrubbing liquid that is located on, above and/or near said throat.

7. The venturi scrubber of claim 6, wherein said sprayer uses a variable spray pattern to spray the scrubbing liquid.

8. The venturi scrubber of claim 6, wherein the location of said sprayer is adjustable to vary the distance between said sprayer and said multiple apertures.

9. The venturi scrubber of claim 1, wherein the sliding of the first plate or the second plate is controlled with a gate valve-type mechanism.

10. The venturi scrubber of claim 9, wherein said gate valve-type mechanism has motorized or manual control.

11. The venturi scrubber of claim 6, wherein the scrubbing liquid comprises water.

12. The venturi scrubber of claim 6, wherein the scrubbing liquid comprises at least one cleaning chemical.

13. The venturi scrubber of claim 1, wherein the throat comprises a modular unit, the modular unit including upstream connection points and downstream connection points for connecting the modular unit to the venturi tube, and an opening for insertion of the first plate and the second plate.

* * * * *